United States Patent [19]

Herman

[11] Patent Number: 5,065,137

[45] Date of Patent: Nov. 12, 1991

[54] MAGNETICALLY-COUPLED, TWO-RESONANT-CIRCUIT, FREQUENCY-DIVISION TAG

[75] Inventor: Fred W. Herman, Tampa, Fla.

[73] Assignee: Security Tag Systems, Inc., St. Petersburg, Fla.

[21] Appl. No.: 562,475

[22] Filed: Aug. 3, 1990

[51] Int. Cl.[5] .......................... G08B 13/14; H02M 5/00

[52] U.S. Cl. .......................... 340/572; 363/157

[58] Field of Search .......................... 340/572; 343/894–895; 363/157–159, 170; 307/271

[56] References Cited

U.S. PATENT DOCUMENTS

| | | | |
|---|---|---|---|
| 4,481,428 | 11/1984 | Charlot, Jr. | 307/219.1 |
| 4,670,740 | 6/1987 | Herman et al. | 340/572 |
| 4,727,360 | 2/1988 | Ferguson et al. | 340/572 |

*Primary Examiner*—Glen R. Swann, III
*Assistant Examiner*—Thomas J. Mullen, Jr.
*Attorney, Agent, or Firm*—Edward W. Callan

[57] ABSTRACT

A batteryless, portable, frequency divider according to the present invention includes a first resonant LC circuit that is resonant at a first frequency for receiving electromagnetic radiation at the first frequency; and a second resonant LC circuit that is resonant at a second frequency that is one-half the first frequency for transmitting electromagnetic radiation at the second frequency. The first circuit is coupled only magnetically to the second circuit to transfer energy to the second circuit at the first frequency in response to receipt by the first circuit of electromagnetic radiation at the first frequency. The second circuit includes a variable reactance element, such as a variable capacitance diode or varactor, in which the reactance varies with variations in energy transferred from the first circuit for causing the second circuit to transmit electromagnetic radiation at the second frequency in response to the energy transferred from the first circuit at the first frequency. Both resonant circuits include inductance coils that are disposed on a ferrite rod, for enhancing the magnetic coupling. The frequency divider may be extremely small, such as approximately one inch (2.5 cm) in length, but nevertheless has a frequency division energy transfer efficiency of the same order of magnitude as that of much larger frequency dividers. The frequency divider is included in a tag utilized in a presence detection system.

20 Claims, 1 Drawing Sheet

MAGNETICALLY-COUPLED, TWO-RESONANT-CIRCUIT, FREQUENCY-DIVISION TAG

BACKGROUND OF THE INVENTION

The present invention generally pertains to frequency dividers and is particularly directed to portable, batteryless, frequency dividers of type that are included in tags that are used in presence detection systems.

Portable, batteryless, frequency dividers are described in U.S. Pat. No. 4,481,428 to Lincoln H. Charlot, Jr. and in U.S. Pat. No. 4,670,740 to Fred Wade Herman and Lincoln H. Charlot, Jr.

The frequency divider described in the '428 patent includes a resonant first circuit that is resonant at a first frequency for receiving electromagnetic radiation at the first frequency, and a second resonant circuit that is resonant at a second frequency that is one-half the first frequency for transmitting electromagnetic radiation at the second frequency; and the two resonant circuits are electrically connected to one another by a semiconductor switching device having gain coupling the first and second resonant circuits for causing the second circuit to transmit electromagnetic radiation at the second frequency solely in response to unrectified energy at the first frequency provided in the first circuit upon receipt of electromagnetic radiation at the first frequency. Each resonant circuit includes a fixed capacitance connected in parallel with an inductance coil. In order to minimize difficulties due to magnetic coupling between the coils when tuning the resonant circuits to their respective resonant frequencies the coils are disposed perpendicular to each other so that the magnetic fields of the two coils are orthogonal to each other. In one current embodiment of this frequency divider that utilizes an air core coil for the first resonant circuit and a ferrite core coil for the second resonant circuit, the inside diameter of the air core coil is much larger than the diameter of the ferrite core coil to further minimize the magnetic coupling between the coils.

The frequency divider described in the '740 patent consists of a single resonant circuit consisting of an inductor and a diode or varactor connected in parallel with the diode or varactor to define a resonant circuit that detects electromagnetic radiation at a first predetermined frequency and responds to said detection by transmitting eletromagnetic radiation at a second frequency that is one-half the first frequency, wherein the circuit is resonant at the second frequency when the voltage across the diode or varactor is zero.

Although the frequency divider described in the '740 patent is less complex than the frequency divider described in the '428 patent, whereby the former may be manufactured less expensively and packaged more compactly in a tag for attachment to an article to be detected by a presence detection system, the former also is less efficient in initiating frequency division from the energy of the detected eletromagnetic radiation, since the frequency divider circuit is resonant at only the second frequency.

SUMMARY OF THE INVENTION

The present invention provides a frequency divider that is less complex and expensive to manufacture and that may be packaged more compactly than the frequency divider described in the '428 patent without a significant decrease in performance.

A batteryless, portable, frequency divider according to the present invention includes a first resonant circuit that is resonant at a first frequency for receiving electromagnetic radiation at the first frequency; and a second resonant circuit that is resonant at a second frequency that is one-half the first frequency for transmitting electromagnetic radiation at the second frequency; wherein the first circuit is coupled only magnetically to the second circuit to transfer energy to the second circuit at the first frequency in response to receipt by the first circuit of electromagnetic radiation at the first frequency; and wherein the second circuit includes a variable reactance element in which the reactance varies with variations in energy transferred from the first circuit for causing the second circuit to transmit electromagnetic radiation at the second frequency in response to the energy transferred from the first circuit at the first frequency. Preferably each circuit includes a capacitance and an inductance coil, with the coils being disposed on magnetic circuit means for enhancing said magnetic coupling.

By utilizing only magnetic coupling between the resonant circuits, costly and/or energy dissipating elements that are used for electrically connecting the resonant circuits in such a manner as to produce frequency division in the prior art frequency dividers are eliminated.

The present invention also provides a tag including the frequency divider of the present invention and a presence detection system including such tag.

Additional features of the present invention are described in relation to the description of the preferred embodiments.

DESCRIPTION OF THE PREFERRED EMBODIMENTS

Figure 1:
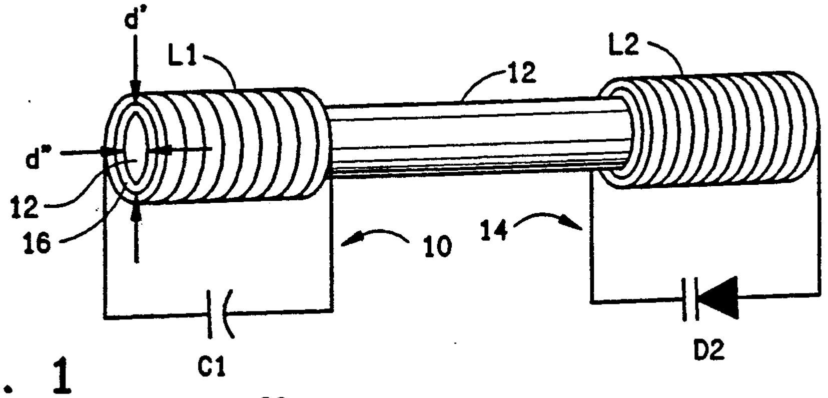
FIG. 1 is a diagram of a preferred embodiment of the frequency divider of the present invention.

Referring to FIG. 1, a preferred embodiment of a frequency divider according to the present invention includes a first resonant circuit 10 consisting of a capacitor C1 connected in parallel with an inductance coil L1 wound about a straight ferrite rod 12; and a second resonant circuit 14 consisting of a variable capacitance diode or varactor D2 connected in parallel with a second inductance coil L2 that is also wound about the ferrite rod 12.

The first resonant circuit 10 is resonant at a first frequency $f_1$ for receiving electromagnetic radiation at the first frequency $f_1$; and the second resonant circuit 14 is resonant at a second frequency $f_2$ that is one-half the first frequency $f_1$ for transmitting electromagnetic radiation at the second frequency $f_2$. The first circuit 10 is coupled only magnetically by the ferrite rod 12 and air to the second circuit 14 to transfer energy to the second circuit 14 at the first frequency $f_1$ in response to receipt by the first circuit 10 of electromagnetic radiation at the first frequency $f_1$. The variable capacitance diode or varactor D2 in the second circuit 14 is a variable reactance element in which the reactance varies with variations in energy transferred from the first circuit 10 for causing the second circuit 14 to transmit electromagnetic radiation at the second frequency $f_2$ in response to the energy transferred from the first circuit 10 at the first frequency $f_1$.

It is believed that the coil L1 of the first resonant circuit 10 enhances the electromagnetic radiation at the first frequency $f_1$ that is induced in the coil L2 of the second resonant circuit 14, and thereby decreases the required field strength of electromagnetic radiation at the first frequency $f_1$ necessary for accomplishing frequency division.

Because the values of the inductances in each of the resonant circuits 10, 14 are affected by the respective positions of the coils L1 and L2 on the ferrite rod 12 in relation to each other and in relation to the ends of the rod 12, the resonant circuits 10, 14 are tuned to their respective resonant frequencies $f_1$ and $f_2$ by adjusting the positions of the coils L1 and L2 on the rod 12.

In order that the coils L1 and L2 are not so highly coupled to each other that adjusting the position of a coil in one resonant circuit so greatly affects the resonant frequency of the other resonant circuit as a result of the interactive coupling between the two coils as to make tuning of both resonant circuits difficult, the coils L1, L2 are wound with an inside dimension d' that is somewhat larger than the cross-sectional dimension d'' of the ferrite rod 12. The coils L1, L2 are wound on a non-magnetic spacing element 16 that is adjustably mounted on the ferrite rod 12. In the preferred embodiment, the rod 12 has a diameter d'' of approximately 0.125 inch (0.31 cm.); and the coils L1, L2 each have an inside diameter of approximately 0.15 inch (0.38 cm.).

It has been determined that in order to accomplish frequency division, the coupling coefficient "k" between the inductance coil L1 of the first resonant circuit 10 and the inductance coil L2 of the second resonant circuit 14 should be within a range of zero to 0.6; and that conversion of the energy of electromagnetic radiation at the first resonant frequency $f_1$ received by the first resonant circuit 10 into electromagnetic radiation radiated by the second resonant circuit 14 at the second frequency $f_2$ is most efficient when the coupling coefficient k is about 0.3.

In one example of the preferred embodiment of FIG. 1, the coils L1 and L2 are wound on opposite ends of a 1.25 inch (3.2 cm.) long straight ferrite rod 12 having a diameter of 0.125 inch (0.3 cm.). Each coil L1, L2 is approximately 0.375 inch (0.95 cm.) long, with the ends of the coils L1, L2 adjacent the respective ends of the rod 12 being positioned ±0.125 inch from the ends of the rod 12. The coils should be at least 0.375 inch apart to prevent such interactive coupling as would make tuning of both resonant circuits 10, 14 difficult. Each coil L1, L2 should not be longer than approximately 35 percent of the length of the rod 12.

The frequency divider of this example is activated at signal levels that are several orders of magnitude below those of prior art frequency dividers of similar size. Even more important the frequency division efficiency of this frequency divider as determined by its energy transfer function is very high, thereby enabling transmission of electromagnetic radiation at the frequency-divided second resonant frequency $f_2$ having the same order of magnitude as provided by prior art frequency dividers that are many times larger.

In this example, the capacitance C1 is a 680 pico-farad capacitor and the diode or varactor D1 has a varactor junction capacitance of approximately 600 pico-farads.

A variable capacitance diode or varactor D1, which has one or a plurality of parallel varactor junctions that exhibit a large and nonlinear change in capacitance with small levels of applied alternating voltage, such as a zener diode, is utilized as the voltage-responsive-variable-reactance element in the second resonant circuit 14 because of its low cost. In other embodiments some other device exhibiting the required large and nonlinear capacitance variation with applied alternating voltage, and having sufficiently low loss, and a high Q factor, could be substituted for a variable capacitance diode or varactor.

Low-magnetic-loss ferromagnetic materials other than ferrite can be utilized in the rod 12 of the magnetic circuit means.

In an alternative embodiment (not shown), the magnetic circuit means used to couple the coils of the different resonant circuits is merely air. This embodiment is the least complex; and adequate magnetic coupling can be attained to provide a presence detection tag that is practical for some applications by disposing the coils in close proximity to one another. However, this embodiment may be more difficult to tune to the respective resonant frequencies in the absence of a ferrite core which enables fine adjustments of the resonant frequencies by adjustment of the positions of coils on the core, as discussed above.

In various other preferred embodiments, the magnetic circuit means for coupling the coils of the different resonant circuits are ferrite elements having configurations other than that of a straight rod. By changing the shape of the magnetic circuit means, the orientation of the response of a tag containing the frequency divider may be tailored to specific applications and configurations of exciting electromagnetic fields at the first resonant frequency $f_1$.

Figure 2:
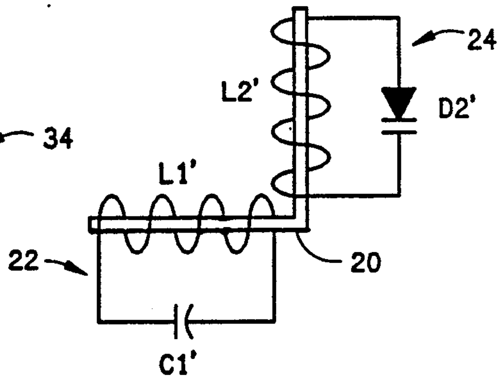
FIG. 2 is a diagram of an alternative preferred embodiment of the frequency divider of the present invention.

In one such embodiment, as shown in FIG. 2, the magnetic circuit means includes an L-shaped ferrite element 20. In this embodiment, the frequency divider includes a first resonant circuit 22 consisting of a capacitor C1' connected in parallel with an inductance coil L1' wound about one end of the L-shaped ferrite element 20; and a second resonant circuit 24 consisting of a variable capacitance diode or varactor D2' connected in parallel with a second inductance coil L2' that is wound about the other end of the L-shaped ferrite element 20. In other respects the construction of the frequency divider of FIG. 2 is subject to the conditions stated above with respect to the construction of the frequency divider of FIG. 1, such that the operation of the frequency divider of FIG. 2 is the same as the operation of the frequency divider of FIG. 1.

Figure 3:
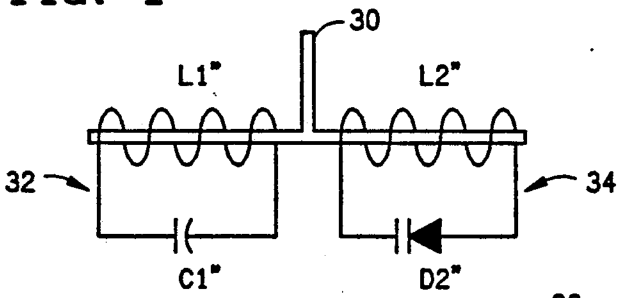
FIG. 3 is a diagram of another alternative preferred embodiment of the frequency divider of the present invention.

In another such embodiment, as shown in FIG. 3, more than two magnetic poles are incorporated into a magnetic circuit element 30 for controlling the orientation and amount of coupling of the first resonant frequency $f_1$ and the second resonant frequency $f_2$ to the surrounding space. In this embodiment, the frequency divider includes a first resonant circuit 32 consisting of a capacitor C1″ connected in parallel with an inductance coil L1″ wound about one end of the ferrite element 30; and a second resonant circuit 34 consisting of a variable capacitance diode or varactor D2″ connected in parallel with a second inductance coil L2″ that is wound about the other end of the ferrite element 30. In other respects the construction of the frequency divider of FIG. 3 is subject to the conditions stated above with respect to the construction of the frequency divider of FIG. 1, such that the operation of the frequency divider of FIG. 3 is the same as the operation of the frequency divider of FIG. 1.

The magnetic circuit means may include two or more separate ferrite rods that are closely magnetically coupled to each other to optimize performance and/or provide a magnetic circuit with a larger aperture than can be achieved with a single ferrite rod of the maximum manufacturable length. Currently ferrite rods cannot be cheaply manufactured with length-to-diameter ratios greater than ten or twelve. By disposing a plurality of straight ferrite rods end to end, the aperture of the magnetic circuit can be enlarged.

Also by providing an air-gap in the magnetic circuit between separate ferrite rods upon which the coils of the separate resonant circuits are respectively disposed, the interactive magnetic coupling between the coils is decreased by decreasing the reluctance between the coils, thereby making the separate resonant circuits easier to tune by adjusting the positions of the coils on the rods.

Figure 4:
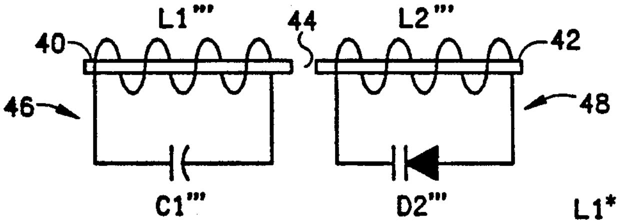
FIG. 4 is a diagram of still another alternative preferred embodiment of the frequency divider of the present invention.

In one embodiment utilizing a plurality of ferromagnetic rods in the magnetic circuit, as shown in FIG. 4, the magnetic circuit means include two straight ferromagnetic rods 40, 42 disposed end to end with an air gap 44 therebetween. In this embodiment, the frequency divider includes a first resonant circuit 46 consisting of a capacitor C1‴ connected in parallel with an inductance coil L1‴ wound about one of the ferrite rods 40; and a second resonant circuit 48 consisting of a variable capacitance diode or varactor D2‴ connected in parallel with a second inductance coil L2‴ that is wound about the other of the ferrite rods 42. In other respects the construction of the frequency divider of FIG. 2 is subject to the conditions stated above with respect to the construction of the frequency divider of FIG. 1, such that the operation of the frequency divider of FIG. 4 is the same as the operation of the frequency divider of FIG. 1.

Figure 5:
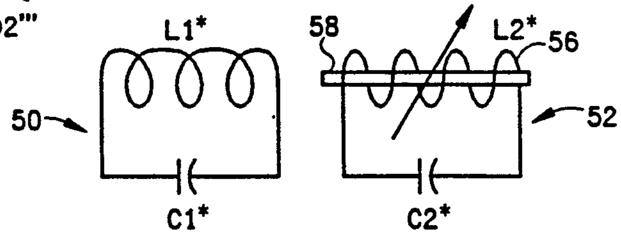
FIG. 5 is a diagram of yet another alternative preferred embodiment of the frequency divider of the present invention.

In another embodiment of the present invention, as shown in FIG. 5, the variable reactance element of the second resonant circuit is a variable inductance element rather than a variable capacitance element, as in the embodiment described above. In this embodiment, the frequency divider includes a first resonant circuit 50 consisting of capacitor C1* connected in parallel with an inductance coil L1*; and a second resonant circuit 52 consisting of a second capacitance C2* connected in parallel with a variable inductance element L2*. The first resonant circuit 50 and the second resonant circuit 52 are coupled only magnetically by such magnetic circuit means as described above in relation to the description of the other embodiments. The variable inductance element L2* includes an inductance coil 56 and a low-loss ferromagnetic material 58 that exhibits a large change in permeability within the desired voltage range of the incident electromagnetic radiation at the first predetermined frequency $f_1$. The low-loss ferromagnetic material 58 is placed in the magnetic circuit of the inductance coil 56. In this embodiment, not only are the bulk magnetic characteristics of the ferromagnetic material 58 important, but also the physical shape of the ferromagnetic material 58 has profound effects upon the frequency division characteristics of the second resonant circuit 52. Ferrite materials are preferred for the ferromagnetic material 58. The material formulation is selected to give the desired characteristics at the chosen operating frequency. With the proper design of resonant circuits 50, 52, operation is possible from the low kilohertz region through the microwave region. In other respects the construction of the frequency divider of FIG. 5 is subject to the conditions stated above with respect to the construction of the frequency divider of FIG. 1, such that the operation of the frequency divider of FIG. 5 is the same as the operation of the frequency divider of FIG. 1.

In the embodiments of the frequency divider of the present invention described above, the resonant circuits have been described as including inductance coils and capacitances because the described embodiments are designed for use at relatively low frequencies. In embodiments of the frequency divider designed for use at high frequencies, such as those in the microwave region, the resonant circuits include elements embodying micro-strip, strip-line, and/or cavity technology.

Also, in further embodiments of the frequency divider of the present invention, the second resonant circuit may be a device that mechanically resonates at the second frequency. A mechanically resonant device is equivalent to a parallel LC resonant circuit.

Figure 6:
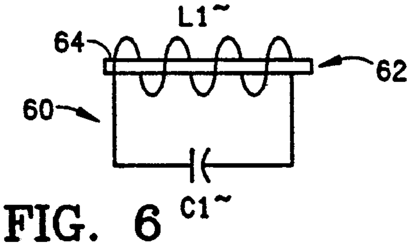
FIG. 6 is a diagram of a further alternative preferred embodiment of the frequency divider of the present invention.

In one such embodiment, as shown in FIG. 6, the frequency divider includes a first resonant circuit 60 consisting of a capacitor C1∼ connected in parallel with an inductance coil L1∼; and a second resonant circuit 62 consisting of strip 64 of saturable magnetostrictive magnetic material that is magnetomechanically resonant at a frequency $f_2$ that is one-half the resonant frequency $f_1$ of the first resonant circuit 60. The coil L1∼ of the first resonant circuit 60 is magnetically coupled to the magnetomechanically resonant strip 64 by being wound around the strip 64. The inside dimension of the coil L1∼ is spaced from the strip 64 so as not to be so tightly wound around the strip 64 as to make tuning of the first resonant circuit 60 difficult.

The strip 64 is mechanically resonant in the length extensional mode and functions as a variable reactance core of field level variable permeability material to convert electromagnetic radiation received by the first resonant circuit 60 at the frequency $f_1$ into electromagnetic radiation at the frequency $f_2$ that is one-half the resonant frequency $f_1$ of the first resonant circuit 60.

In the preferred embodiment the strip 64 is a saturable magnetostrictive amorphous ferromagnetic material such as described in U.S. Pat. No. 4,727,360 to Lucian G. Ferguson and Lincoln H. Charlot, Jr.

In other respects the construction of the frequency divider of FIG. 6 is subject to the conditions stated above with respect to the construction of the frequency divider of FIG. 1, such that the operation of the frequency divider of FIG. 2 is the same as the operation of the frequency divider of FIG. 1.

Figure 7:
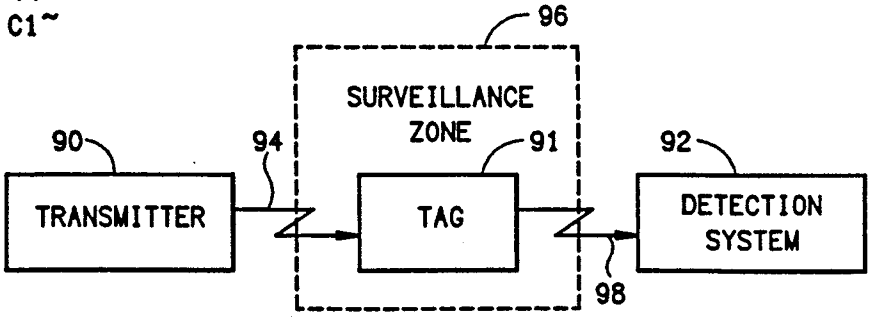
FIG. 7 is a diagram of a presence detection system according to the present invention, including a tag according to the present invention.

The frequency divider of the present invention is utilized in a preferred embodiment of a presence detection system according to the present invention, as shown in FIG. 7. Such system includes a transmitter 90, a tag 91 and a detection system 92.

The transmitter transmits an electromagnetic radiation signal 94 of a first predetermined frequency into a surveillance zone 96.

The tag 91 is attached to an article (not shown) to be detected within the surveillance zone 96. The tag 91 includes a batteryless, portable frequency divider in accordance with the present invention, such as the frequency divider described above with reference to FIG. 1.

The detection system 92 detects electromagnetic radiation 98 in the surveillance zone 68 at a second predetermined frequency that is one-half the first predetermined frequency, and thereby detects the presence of the tag in the surveillance zone 96.

The presence detection system utilizing a tag including the frequency divider of the present invention is used for various applications that take advantage of the size and efficiency of such frequency divider, including applications utilizing longer range tags, and applications utilizing small tags requiring only a short communication range.

In one example, small tags including the frequency divider of the present invention are subcutaneously implanted in animals and such animals are counted by the presence detection system.

In another example, small tags including the frequency divider of the present invention are implanted in non-metallic canisters of explosives and such canisters are detected by the presence detection system.

In still another example, tags including embodiments of the frequency divider of the present invention that are relatively large in one dimension are implanted in non-metallic gun stocks and the guns are detected by the presence detection system.

I claim:

1. A batteryless, portable, frequency divider, comprising a first resonant circuit that is resonant at a first frequency for receiving electromagnetic radiation at the first frequency; and a second resonant circuit that is resonant at a second frequency that is one-half the first frequency for transmitting electromagnetic radiation at the second frequency;

wherein the first circuit is coupled only magnetically to the second circuit to transfer energy to the second circuit at the first frequency in response to receipt by the first circuit of electromagnetic radiation at the first frequency; and wherein the second circuit includes a variable reactance element in which the reactance varies with variations in energy transferred from the first circuit for causing the second circuit to transmit electromagnetic radiation at the second frequency in response to the energy transferred from the first circuit at the first frequency.

2. A frequency divider according to claim 1, wherein each circuit includes a capacitance and an inductance coil, with the coils being disposed on magnetic circuit means for enhancing said magnetic coupling.

3. A frequency divider according to claim 2, wherein the magnetic circuit means consists of a single straight ferromagnetic rod.

4. A frequency divider according to claim 3, wherein the coils of the respective circuits are disposed about opposite ends of the rod.

5. A frequency divider according to claim 4, wherein each coil has an inside dimension that is somewhat larger than the cross-sectional dimension of the rod.

6. A frequency divider according to claim 2, wherein the magnetic circuit means consist of a pair of separate straight ferromagnetic rods that are aligned end to end, with the coil of one resonant circuit being disposed on one rod and the coil of the other circuit being disposed on the other rod.

7. A frequency divider according to claim 1, wherein the variable reactance element is a variable capacitance element.

8. A frequency divider according to claim 1, wherein the variable reactance element is a variable inductance element.

9. A frequency divider according to claim 1, wherein the second circuit is a device that mechanically resonates at the second frequency.

10. A tag for use in a presence detection system, comprising a frequency divider; and means for fastening the frequency divider to an article to be detected by the presence detection system;

wherein the frequency divider comprises a first resonant circuit that is resonant at a first frequency for receiving electromagnetic radiation at the first frequency; and a second resonant circuit that is resonant at a second frequency that is one-half the first frequency for transmitting electromagnetic radiation at the second frequency;

wherein the first circuit is coupled only magnetically to the second circuit to transfer energy to the second circuit at the first frequency in response to receipt by the first circuit of electromagnetic radiation at the first frequency; and wherein the second circuit includes a variable reactance element in which the reactance varies with variations in energy transferred from the first circuit for causing the second circuit to transmit electromagnetic radiation at the second frequency in response to the energy transferred from the first circuit at the first frequency.

11. A tag according to claim 10, wherein each circuit includes a capacitance and an inductance coil, with the coils being disposed on magnetic circuit means for enhancing said magnetic coupling.

12. A tag according to claim 11, wherein the magnetic circuit means consists of a single straight ferromagnetic rod.

13. A tag according to claim 12, wherein the coils of the respective circuits are disposed about opposite ends of the rod.

14. A tag according to claim 13, wherein each coil has an inside dimension that is somewhat larger than the cross-sectional dimension of the rod.

15. A tag according to claim 11, wherein the magnetic circuit means consist of a pair of separate straight ferromagnetic rods that are aligned end to end, with the coil of one resonant circuit being disposed on one rod and the coil of the other circuit being disposed on the other rod.

16. A tag according to claim 10, wherein the variable reactance element is a variable capacitance element.

17. A tag according to claim 10, wherein the variable reactance element is a variable inductance element.

18. A tag according to claim 10, wherein the second circuit is a device that mechanically resonates at the second frequency.

19. A presence detection system, comprising means for transmitting an electromagnetic radiation signal at a first frequency into a surveillance zone;

a tag for attachment to an article to be detected within the surveillance zone, comprising a frequency divider and means for fastening the frequency divider to an article to be detected by the presence detection system; wherein the frequency divider comprises a first resonant circuit that is resonant at a first frequency for receiving electromagnetic radiation at the first frequency; and a second resonant circuit that is resonant at a second frequency that is one-half the first frequency for transmitting electromagnetic radiation at the second frequency;

wherein the first circuit is coupled only magnetically to the second circuit to transfer energy to the second circuit at the first frequency in response to receipt by the first circuit of electromagnetic radiation at the first frequency; and wherein the second circuit includes a variable reactance element in which the reactance varies with variations in energy transferred from the first circuit for causing the second circuit to transmit electromagnetic radiation at the second frequency in response to the energy transferred from the first circuit at the first frequency; and means for detecting electromagnetic radiation at the second frequency in the surveillance zone.

20. A presence detection system according to claim 19, wherein each circuit includes a capacitance and an inductance coil, with the coils being disposed on magnetic circuit means for enhancing said magnetic coupling.

* * * * *